UNITED STATES PATENT OFFICE.

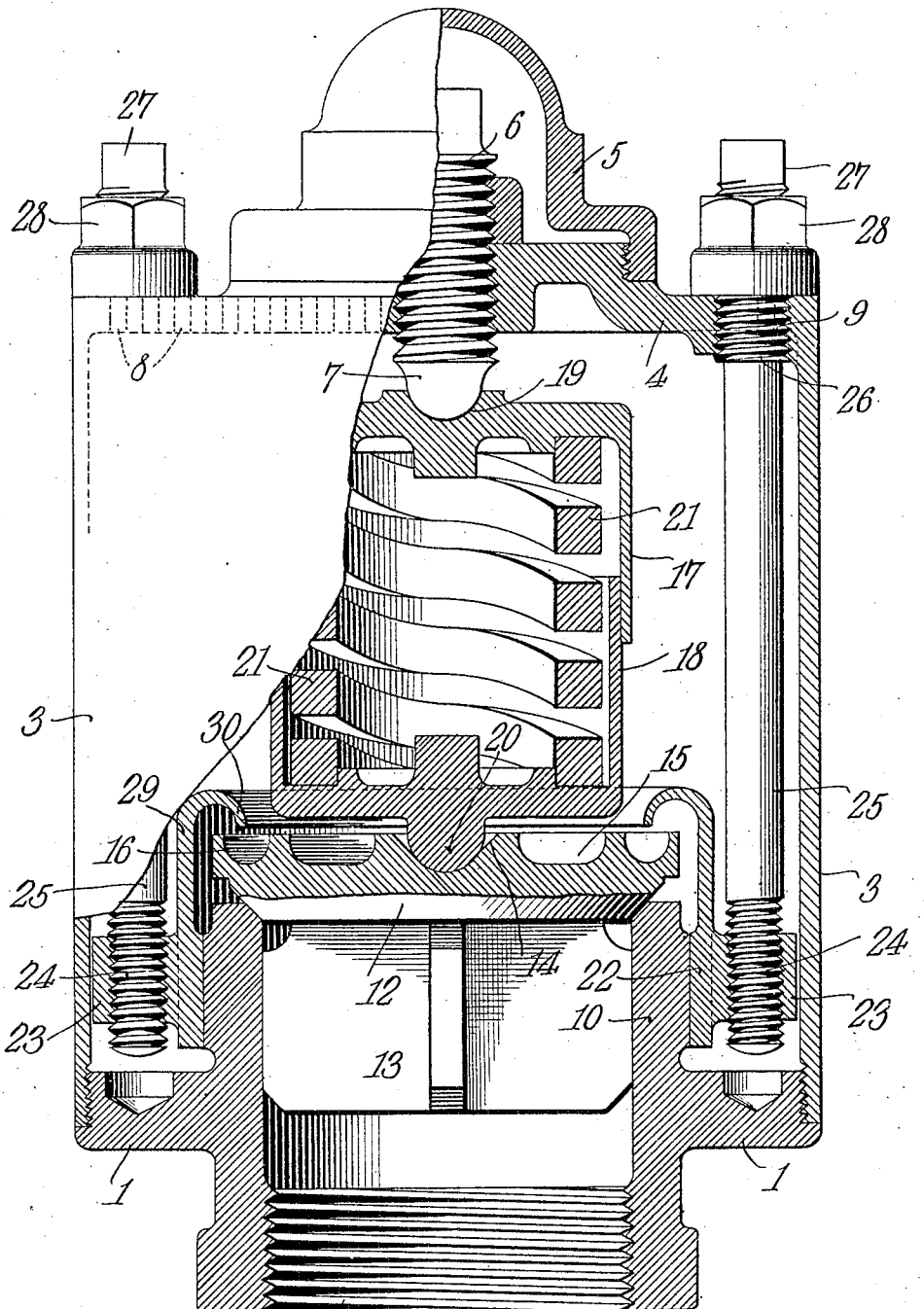

GEORGE E. COUTANT, OF SPRINGFIELD, ILLINOIS, ASSIGNOR OF ONE-HALF TO SAMUEL A. KING, OF PERU, INDIANA.

POP SAFETY-VALVE.

No 849,532.     Specification of Letters Patent.     Patented April 9, 1907.

Application filed January 5, 1907. Serial No. 350,978.

*To all whom it may concern:*

Be it known that I, GEORGE E. COUTANT, a citizen of the United States, residing at Springfield, in the county of Sangamon and State of Illinois, have invented a new and useful Pop Safety-Valve, of which the following is a specification.

This invention relates to pop safety-valves, such as used upon locomotive-boilers and other pressure-retainers.

The object of the invention is to provide means whereby the valve will be prevented from cocking or binding when lifted from its seat by the pressure of fluid, the escaping fluid being utilized for preventing this objectionable result.

A still further object is to provide adjustable means whereby the escaping fluid can be directed onto the valve, so as to practically equalize the pressure upon the inner and outer faces of the valve, thereby necessitating the use of a spring having merely sufficient elasticity to overcome the variations between the pressures on the inner and outer faces of the valve.

With these and other objects in view the invention consists of certain novel features of construction and combinations of parts which will be hereinafter more fully described, and pointed out in the claims.

In the accompanying drawing, which is a view partly in section and partly in elevation, the preferred form of the invention has been shown.

Referring to the drawing by characters of reference, 1 is the base of the valve, the same being provided with a reduced internally-screw-threaded portion 2, adapted to be secured to the steam-boiler or other pressure-retainer in any preferred manner. Screwed upon the base is a cylindrical casing 3, having an integral head 4, on which is detachably mounted a cap 5. Extending through the head and concealed by the cap is a set-screw 6, having a nipple 7 at its inner end for the purpose hereinafter more fully set forth. A plurality of vents 8 are formed within the head at suitable points, and formed within said head at diametrically opposite points are interiorly-screw-threaded apertures 9.

Extending into the casing and formed integral with the base is a cylindrical tubular extension 10, the inner end of which constitutes a seat for a valve 12. This valve has an integral spider 13 of the usual form, which is movably mounted within the extension 11 and serves to hold the valve normally centered. The valve has a central recess 14 in its upper face surrounded by an inner annular compartment 15 and an outer annular compartment 16, both compartments being formed by grooves within the upper face of the valve 12. Telescopic casing-sections 17 and 18 are interposed between the head 4 and the valve 12, and the upper one of these sections has a central recess 19, in which the nipple 7 is seated. A nipple 20 extends from the other section 18 and is seated within the recess 14 in valve 12. The casing formed by the sections 17 and 18 incloses a spring 21, the ends of which bear against the ends of said sections, so as to hold the valve 12 normally upon its seat.

A ring 22 surrounds and is slidably mounted on the extension 10 and has outstanding ears 23 engaged by the threaded ends 24 of bolts 25. These bolts have threaded portions 26 disposed within the apertures 9. The heads 27 of the bolts extend above the casing 3, and nuts 28 are arranged upon these bolts adjacent their heads, so as to lock them in adjusted position. A cylindrical baffle-plate 29 extends from ring 22 and has one end inturned, as shown at 30, the edge of said inturned portion being disposed above and concentric with the center of the outer annular compartment 16.

It will of course be apparent that when the valve 12 is lifted from its seat by fluid under pressure said fluid will escape between the valve and its seat and into the baffle-plate 29. The inturned end of the baffle-plate serves to deflect the fluid into the outer compartment 16, and by adjusting the baffle-plate into proper relation with the valve this downward pressure of the fluid upon said valve will practically equalize the pressure upon the inner face of the valve, so that the tension of spring 21 need only be sufficient to overcome the variations between the pressure upon the inner and outer faces of the valve. By distributing the pressure equally within the compartment 16 the valve is prevented from binding after it has been opened. The casing-sections 17 and 18 shield the spring 21 from the escaping fluid. It is of course understood that when the valve is lifted from its seat the lower section 18 slides into the upper section 17. The fluid released by the raising of the valve passes into the atmosphere through the vents 8. By removing the cap 5 and rotating the set-screw 6 the tension of the spring 21 may be regulated. By rotating the bolts 25 the baffle-plate can be easily adjusted toward or from the valve to meet various conditions and without the necessity of detaching any of the parts of the device.

The preferred form of the invention has been set forth in the foregoing description; but I do not limit myself thereto, as I am aware that modifications may be made therein without departing from the spirit or sacrificing the advantages thereof, and I therefore reserve the right to make such changes as fairly fall within the scope of the claims.

What is claimed is—

1. The combination with a casing having a valve-seat therein; of a spring-pressed valve normally disposed upon the seat, said valve having an annular compartment therein, and means adjustably mounted within the casing for directing escaping fluid into said compartment.

2. The combination with a casing having a valve-seat therein; of a spring-pressed valve normally disposed upon the seat and having an annular compartment in its outer face, means slidably mounted within the casing for directing escaping fluid into the annular compartment, and means for adjusting said slidable means.

3. The combination with a casing having a tubular extension therein constituting a valve-seat; of a spring-pressed valve normally disposed upon the seat and having an annular compartment in its outer face, and a baffle-plate slidably mounted on the extension for directing escaping fluid upon the valve and into the annular compartment.

4. The combination with a casing having a tubular extension therein constituting a valve-seat; of a spring-pressed valve normally disposed upon the seat and having an annular compartment in its outer face, a baffle-plate slidably mounted on the extension and overlapping the valve and its compartment, and means for adjusting said plate toward or from the valve.

5. The combination with a casing having a tubular extension therein constituting a valve-seat; of a spring-pressed valve normally disposed upon the seat and having an annular compartment in its outer face, a baffle-plate slidably mounted on the extension for directing escaping fluid into the annular compartment, and means carried by the casing for adjusting the baffle-plate upon the extension.

6. The combination with a casing having a tubular extension therein constituting a valve-seat; of a spring-pressed valve normally disposed upon the seat and having an annular compartment in the outer face thereof, means for regulating the pressure of the valve upon its seat, and adjustable means for directing escaping fluid upon the valve and into the annular compartment to equalize the pressure beneath the valve.

7. The combination with a casing having a tubular extension therein constituting a valve-seat; of a valve normally disposed upon said seat, said valve having an annular compartment in its outer face, a baffle-plate adjustably mounted on the extension for directing escaping fluid into the annular compartment, and means for adjusting the baffle plate toward or from the valve.

8. The combination with a casing and a tubular extension therein constituting a valve-seat; of a valve normally disposed upon said seat and having an annular compartment in its outer face, a baffle-plate slidably mounted on the extension and having an inturned deflecting portion overlapping the valve and compartment, and means for adjusting the baffle-plate toward or from the valve.

9. The combination with a casing and a tubular extension therein constituting a valve-seat; of a valve normally disposed upon said seat and having an annular compartment in its outer face, a baffle-plate slidably mounted on the extension and having an inturned deflecting portion overlapping the valve and compartment, and rotatable adjusting devices carried by the extension and engaging and adapted to actuate the baffle-plate.

10. The combination with a casing having a valve-seat therein; of a valve normally disposed upon the seat and having an annular compartment therein, and means within the casing for directing escaping fluid into said compartment.

In testimony that I claim the foregoing as my own I have hereto affixed my signature in the presence of two witnesses.

GEORGE E. COUTANT.

Witnesses:
C. E. HEAD,
F. W. BADENHAUSER.